(12) United States Patent
Fyfe et al.

(10) Patent No.: US 11,904,330 B2
(45) Date of Patent: Feb. 20, 2024

(54) COSMETIC DISPENSER WITH ACCORDION BLADDER VALVE SYSTEM

(71) Applicant: L'Oreal, Paris (FR)

(72) Inventors: Jason Fyfe, Holmdel, NJ (US); Andrea Saverino, Colts Neck, NJ (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 17/683,066

(22) Filed: Feb. 28, 2022

(65) Prior Publication Data
US 2023/0271207 A1 Aug. 31, 2023

(51) Int. Cl.
| | |
|---|---|
| *B65D 25/42* | (2006.01) |
| *B05B 11/10* | (2023.01) |
| *A45D 34/04* | (2006.01) |
| *G01F 11/00* | (2006.01) |
| *A45D 34/00* | (2006.01) |

(52) U.S. Cl.
CPC ........ *B05B 11/1032* (2023.01); *A45D 34/00* (2013.01); *A45D 34/04* (2013.01); *B65D 25/42* (2013.01); *G01F 11/00* (2013.01); *A45D 2200/10* (2013.01)

(58) Field of Classification Search
CPC ...... B65D 47/247; B65D 25/52; B65D 35/14; B65D 35/40; B65D 35/28; B65D 25/42; G01F 11/08; G01F 11/082; G01F 11/288–32; G01F 11/36; G01F 11/00; B05B 11/3032; B05B 11/1032; A45D 34/04; A45D 34/00; A45D 2200/10
See application file for complete search history.

(56) References Cited

U.S. PATENT DOCUMENTS

| | | | | |
|---|---|---|---|---|
| 1,621,097 A | * | 3/1927 | Zammataro | B65D 35/20 222/496 |
| 1,896,729 A | * | 2/1933 | Jakubec | B65D 47/2075 222/496 |
| 2,302,539 A | * | 11/1942 | Fuchslocher | B65D 35/20 222/493 |

(Continued)

FOREIGN PATENT DOCUMENTS

| | | |
|---|---|---|
| CN | 113348038 | 9/2021 |
| EP | 0763721 | 3/1997 |

(Continued)

OTHER PUBLICATIONS

Office Action dated May 22, 2023, issued in related U.S. Appl. No. 17/682,927, filed Feb. 28, 2022, 10 pages.

(Continued)

*Primary Examiner* — Frederick C Nicolas
*Assistant Examiner* — Randall A Gruby
(74) *Attorney, Agent, or Firm* — CHRISTENSEN O'CONNOR & JOHNSON KINDNESS PLLC

(57) ABSTRACT

A dispensing system including a cap that is capable of securing the dispensing system to a bottle filled with a formula, wherein the cap is configured to retain a metered dose of the formula, a shaft in fluid communication with the cap, an accordion bladder inside the cap, wherein the accordion bladder includes at least one opening, one or more bellows, and a stopper, a distributor nozzle in fluid communication with the shaft, and an outer nozzle covering the distributor nozzle and configured to dispense the formula.

10 Claims, 5 Drawing Sheets

(56) References Cited

U.S. PATENT DOCUMENTS

| | | | | |
|---|---|---|---|---|
| 3,118,573 A * | 1/1964 | Krogsdale | | B05B 11/047 |
| | | | | 222/491 |
| 3,125,250 A * | 3/1964 | Ballin | | G01F 11/082 |
| | | | | 222/386.5 |
| 3,154,222 A * | 10/1964 | Heckman | | A47G 19/32 |
| | | | | 222/215 |
| 3,165,241 A | 1/1965 | Curry | | |
| 3,193,154 A * | 7/1965 | Bross | | B65D 47/2081 |
| | | | | 222/499 |
| 3,743,146 A * | 7/1973 | Schindler | | G01F 11/08 |
| | | | | 222/541.6 |
| 3,828,985 A * | 8/1974 | Schindler | | B05B 11/1028 |
| | | | | 222/207 |
| 3,910,467 A | 10/1975 | Nilson | | |
| 4,201,317 A | 5/1980 | Aleff | | |
| 4,452,381 A | 6/1984 | Freeman | | |
| 4,469,250 A | 9/1984 | Evezich | | |
| 4,506,809 A * | 3/1985 | Corsette | | B65D 47/2081 |
| | | | | 137/493 |
| 4,747,522 A * | 5/1988 | McIntyre | | B65D 47/2075 |
| | | | | 222/496 |
| 4,811,871 A * | 3/1989 | Wass | | B67C 9/00 |
| | | | | 222/548 |
| 4,863,070 A * | 9/1989 | Andris | | B05B 11/1035 |
| | | | | 222/207 |
| 4,877,624 A * | 10/1989 | Floyd | | F16K 17/02 |
| | | | | 99/359 |
| 4,886,193 A | 12/1989 | Wassilieff | | |
| 5,000,353 A * | 3/1991 | Kostanecki | | G01F 11/263 |
| | | | | 222/207 |
| 5,065,913 A | 11/1991 | Glasener | | |
| 5,197,638 A * | 3/1993 | Wood | | B65D 35/20 |
| | | | | 239/533.1 |
| 5,275,312 A * | 1/1994 | Labruzzo | | B65D 47/2075 |
| | | | | 222/570 |
| 5,305,920 A | 4/1994 | Reiboldt | | |
| 5,462,208 A * | 10/1995 | Stahley | | B05B 7/0037 |
| | | | | 222/207 |
| 5,524,795 A * | 6/1996 | Lee | | B65D 47/2068 |
| | | | | 222/207 |
| 5,529,213 A | 6/1996 | Mack | | |
| 5,544,789 A * | 8/1996 | Gillingham | | B05B 11/106 |
| | | | | 222/207 |
| 5,862,955 A * | 1/1999 | Albini | | B05B 11/1028 |
| | | | | 222/496 |
| 5,957,606 A | 9/1999 | Jafarmadar | | |
| 6,135,311 A | 10/2000 | Panec et al. | | |
| 6,341,718 B1 | 1/2002 | Schilthuizen | | |
| 6,415,961 B2 * | 7/2002 | Bonningue | | G01F 11/16 |
| | | | | 222/207 |
| 6,598,757 B2 | 7/2003 | Stillinger | | |
| 6,629,624 B2 | 10/2003 | Stillinger et al. | | |
| 6,631,823 B2 | 10/2003 | Stillinger et al. | | |
| 6,672,486 B2 * | 1/2004 | Santagiuliana | | B05B 11/1077 |
| | | | | 222/207 |
| 6,688,500 B1 | 2/2004 | Cheng | | |
| 6,938,800 B1 * | 9/2005 | Lehmkuhl | | B65D 35/20 |
| | | | | 222/496 |
| 7,025,233 B2 * | 4/2006 | Masuda | | B05B 11/1067 |
| | | | | 222/207 |
| 8,231,597 B2 | 7/2012 | Knight | | |
| 8,366,681 B2 * | 2/2013 | Carpenter | | A61M 3/022 |
| | | | | 604/257 |
| 8,528,791 B2 * | 9/2013 | Fernandez de Mendiola Quintana | | B65D 47/247 |
| | | | | 222/213 |
| 8,740,023 B2 * | 6/2014 | Geiger | | B65D 47/2025 |
| | | | | 222/422 |
| 8,863,998 B2 * | 10/2014 | Painchaud | | B65D 47/2081 |
| | | | | 222/1 |
| 8,956,334 B2 | 2/2015 | Hirt et al. | | |
| 8,997,788 B2 * | 4/2015 | Wozna | | G01F 11/286 |
| | | | | 222/207 |
| 9,555,426 B2 | 1/2017 | Skillin | | |
| 9,637,282 B2 | 5/2017 | Sakimura | | |
| 10,071,836 B2 | 9/2018 | Holroyd | | |
| 10,093,459 B2 * | 10/2018 | Ikegami | | A61J 1/1406 |
| 10,234,318 B2 | 3/2019 | Pater | | |
| 10,259,624 B2 | 4/2019 | Sakimura | | |
| 10,422,679 B2 * | 9/2019 | Geissler | | G01F 11/288 |
| 10,472,139 B2 | 11/2019 | Dubiel | | |
| 10,654,629 B2 | 5/2020 | Murase | | |
| 10,689,163 B2 * | 6/2020 | Ezzina | | B05B 11/0072 |
| 2002/0177534 A1 | 11/2002 | Paul | | |
| 2004/0050872 A1 * | 3/2004 | Masuda | | B65D 47/2075 |
| | | | | 222/212 |
| 2004/0112925 A1 | 6/2004 | Py | | |
| 2004/0161447 A1 | 8/2004 | Paul | | |
| 2007/0157991 A1 * | 7/2007 | Robertson | | A47K 5/1208 |
| | | | | 222/207 |
| 2008/0142545 A1 | 6/2008 | Priolo | | |
| 2009/0242556 A1 | 10/2009 | Pearlstein | | |
| 2010/0116849 A1 * | 5/2010 | Lautre | | B05B 11/0029 |
| | | | | 222/207 |
| 2011/0118676 A1 | 5/2011 | Kropczynski, Jr. | | |
| 2012/0024904 A1 * | 2/2012 | Doulin | | B05B 11/1061 |
| | | | | 222/207 |
| 2012/0279985 A1 | 11/2012 | Snow | | |
| 2013/0214008 A1 * | 8/2013 | van de Poll | | B05B 11/04 |
| | | | | 222/207 |
| 2014/0021221 A1 | 1/2014 | Derby | | |
| 2015/0266657 A1 | 9/2015 | Corney | | |
| 2018/0251274 A1 | 9/2018 | Hashimoto | | |
| 2021/0221575 A1 | 7/2021 | Pozzi | | |
| 2023/0273059 A1 | 8/2023 | Fyfe | | |

FOREIGN PATENT DOCUMENTS

| | | |
|---|---|---|
| EP | 2993447 | 3/2016 |
| FR | 1303048 A | 9/1962 |
| FR | 1307978 A | 11/1962 |
| FR | 2493515 A1 | 5/1982 |
| FR | 2974351 | 10/2012 |
| WO | 9521098 | 8/1995 |
| WO | 2021156702 A1 | 8/2021 |

OTHER PUBLICATIONS

Search Report and Written Opinion, issued in corresponding French Application No. 2204067, filed Apr. 29, 2022, 7 pages.

Notice of Allowance dated Aug. 9, 2023, issued in corresponding U.S. Appl. No. 17/682,927, filed Feb. 28, 2022, 9 pages.

Search Report and Written Opinion dated Dec. 19, 2022, issued in corresponding French Application No. 2204061, filed Apr. 19, 2022, 10 pages.

* cited by examiner

COSMETIC DISPENSER WITH ACCORDION BLADDER VALVE SYSTEM

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Dispensers are necessary components for dispensing a range of formulas from containers. However, current dispensers still have issues with leaking, especially during manufacture and transportation. Additionally, bottles containing liquids and other low viscosity formulas often include an induction seal which can only prevent leaking before the product is opened. Once the induction seal is broken, the bottle may still leak. Further, it can be difficult to dispense low viscosity formulas in a metered way.

Described herein is a dispensing system that does not include an induction seal, but still can prevent leaking of bottles containing low viscosity formulas. Additionally, a dispensing system that can dispense low viscosity formulas in a metered dose is disclosed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

In one aspect, a dispensing system comprising a cap configured to secure the dispensing system to a bottle filled with a formula, wherein the cap is configured to retain a metered dose of the formula, a shaft in fluid communication with the cap, an accordion bladder inside the cap, wherein the accordion bladder comprises at least one opening, and wherein the accordion bladder is configured to compress, a distributor nozzle in fluid communication with the shaft, and an outer nozzle covering the distributor nozzle and configured to dispense the formula is disclosed.

In another aspect a method of using the dispensing system of any one of the preceding Claims, the method comprising compressing a bottle a first time, wherein the bottle contains a formula, filling a cap with a metered dose of the formula as the accordion bladder compresses, and a stopper on the accordion bladder blocks a shaft to prevent formula from entering the shaft, allowing the accordion bladder to retain the metered dose of the formula through at least one opening of the accordion bladder, actuating an actuator to place the system into an active state, compressing the bottle a second time, wherein compressing the bottle the second time compresses the accordion bladder, pushing the metered dose through the shaft, and dispensing the metered dose is disclosed.

In some embodiments, the formula is a hair care product, such as a toner or serum. In some embodiments, the hair care product is a product with a low viscosity, such as a viscosity below 50 VI. In some embodiments, the formula is a liquid.

Figure 1:
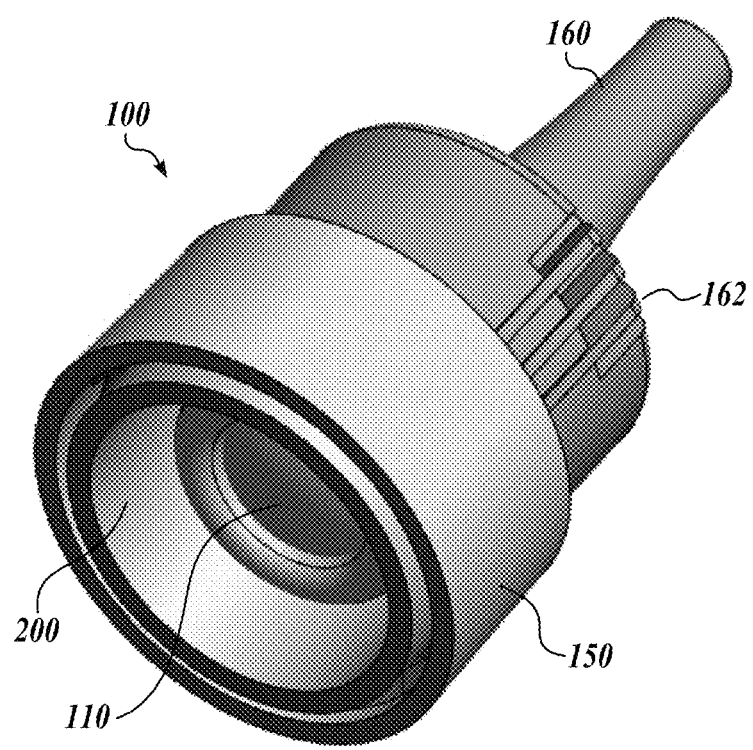
FIG. 1 is an example dispensing system, in accordance with the present technology.

FIG. 1 is an example dispensing system 100, in accordance with the present technology. In some embodiments, the dispensing system includes an outer nozzle 160, an actuator 162, a cap 150, and a bladder 110.

In some embodiments, the dispensing system 100 is secured to a bottle 200 with the cap 150. In some embodiments, the dispensing system 100 is secured to the bottle 200 with a plurality of threads (not shown in FIG. 1) inside the cap 150, so that the bottle may be twisted onto the dispensing system 100. In some embodiments, the dispensing system is secured to the bottle with one or more tabs inside the cap 150, as described herein in FIG. 5.

Figure 4:
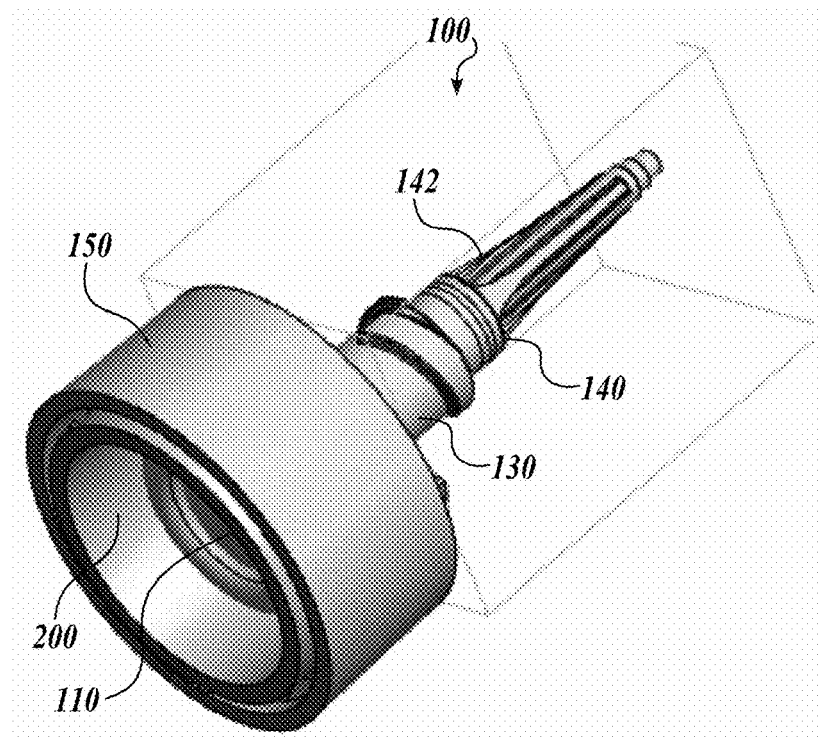
FIG. 4 is an internal view of an example dispensing system, in accordance with the present technology.

In some embodiments, the dispensing system includes an outer nozzle 160. In some embodiments, the outer nozzle 160 is disposed above a distributor nozzle 140, as illustrated in FIG. 4. In some embodiments, the outer nozzle 160 includes a hole where a formula can be dispensed out at the tip of the outer nozzle 160. In some embodiments, the dispensing system includes an actuator 162. In some embodiments, the actuator 160 is threaded so that when the actuator is twisted in one direction, such as clockwise, the dispensing system is placed into an active state, and when twisted the other direction, such as counterclockwise, the dispensing system is placed into an inactive state. As described herein, an active state is any state in which the dispensing system can dispense a formula, and the inactive state is any state in which the dispensing system cannot dispense a formula. In some embodiments, such as illustrated in FIG. 1, the actuator 166 has a series of ridges. In some embodiments, the series of ridges indicate to the user visually that the actuator is present. In some embodiments, the actuator may be any mechanism to place the dispensing system into an active state. In some embodiments, the actuator may be a button, a switch, a capacitance-type touch button, or the like.

In operation, the actuator can be actuated, such as by a user's hand or finger, to place the dispensing system into an active state. In some embodiments, the actuator is twisted clockwise to place the dispensing system into an active state. In some embodiments, when the actuator is twisted in a direction, such as clockwise, the outer nozzle 160 lifts to uncover the hole at the tip of the outer nozzle 160.

In some embodiments, the dispensing system 100 includes a bladder 110. As described in more detail herein, the bladder 110 compresses when an attached bottle 200 is compressed, allowing the cap 150 to fill with formula. When the bottle 200 is no longer compressed, the formula can flow through a plurality of opening 112 (as shown in FIG. 2B) so that the formula is retained in the bladder.

Figure 2A:
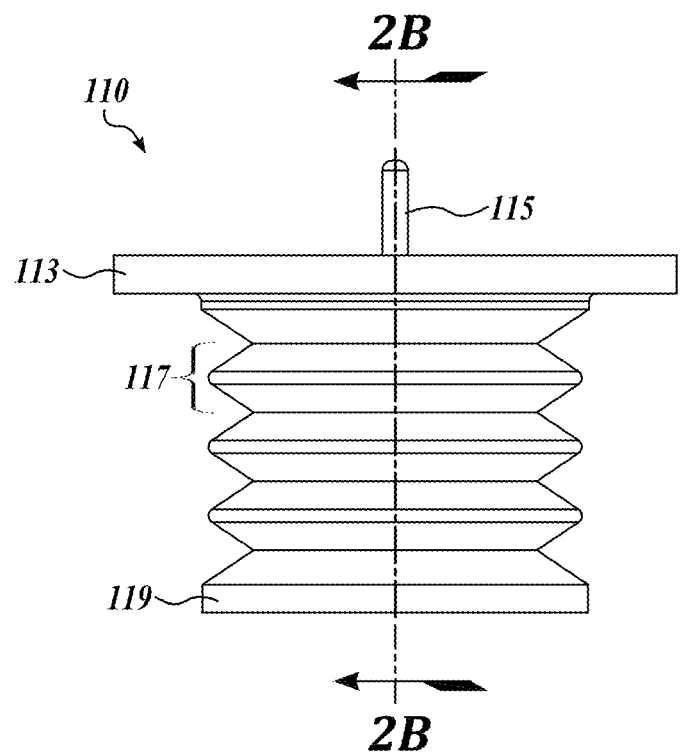
FIG. 2A is an example bladder, in accordance with the present technology.
Figure 2B:
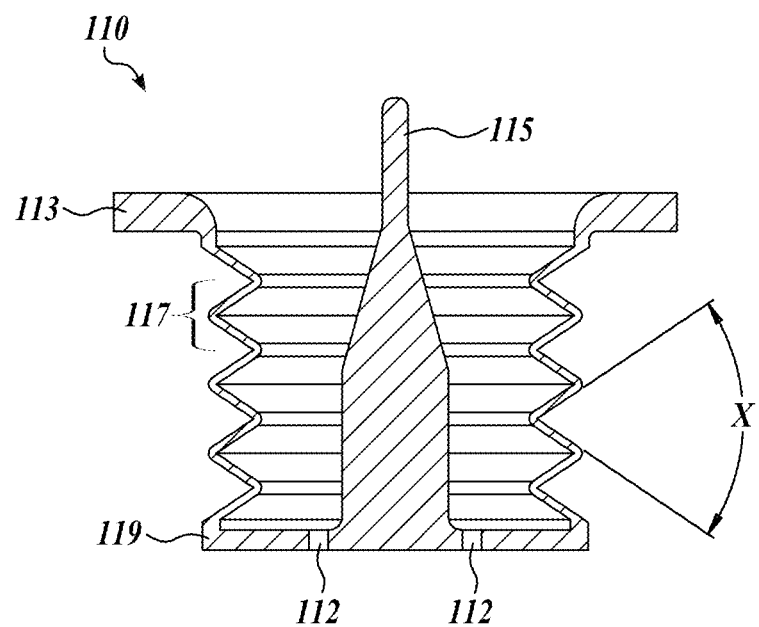
FIG. 2B is a cross section of an example bladder, in accordance with the present technology.

FIG. 2A is an example accordion bladder, in accordance with the present technology. In some embodiments, the dispensing system includes an accordion bladder (or bellows bladder) 110 located inside the cap 150 and fluidly coupled to a formula inside of the bottle 200. In some embodiments, the accordion bladder 110 includes a stopper 115, a base 119, and one or more bellows 117.

In some embodiments, the entire accordion bladder 110 is made of a flexible material, such as silicon. In other embodiments, components of the accordion bladder 110, such as the stopper 115, are made of a rigid material, such as plastic. In some embodiments, the accordion bladder 110 includes at least one opening 112 (as shown in FIG. 2B). In some embodiments, the at least one opening 112 is larger to allow for a formula of higher viscosity to be dispensed. In some embodiments, the at least one opening is 112 smaller, such as when the formula is a lower viscosity.

In some embodiments, the accordion bladder 110 includes an attachment 113. In some embodiments, the attachment 113 is configured to secure the accordion bladder 110 to the cap 150. In some embodiments, the attachment 113 is made of the same material as the accordion bladder 110. In some embodiments, the attachment 113 is silicon. In some embodiments, the attachment 113 is made of a rigid material. In some embodiments, the attachment 113 is made of a different material than the rest of the accordion bladder 110. While the attachment 113 is illustrated as a ring, the attachment 113 may take any form capable of securing the bladder to the cap 150. In some embodiments, the attachment 113 may snap into the cap 150. In some embodiments, the attachment 113 may be slid into the cap 150.

In some embodiments, the accordion bladder 110 includes a base 119. In some embodiments, the stopper 115 is connected to the accordion bladder 110 at the base 119. In some embodiments, the base 119 is made of a rigid material, but in other embodiments, the base 119 may be made of silicon, or another flexible material.

In some embodiments, the bladder 110 includes one or more bellows 117. In some embodiments, the bellows 117 are circular, but in other embodiments, the bellows 117 may take any shape. In operation, the one or more bellows 117 compress to dispense the formula.

FIG. 2B is a cross section of an example is an internal view of an example dispensing system, in accordance with the present technology. FIG. 2B represents a cross section taken at Line A in FIG. 2A. In some embodiments, the accordion bladder 110 rests inside the cap 150. In some embodiments, the accordion bladder 110 includes an attachment 113. In some embodiments, the attachment 113 is configured to secure the accordion bladder in the cap. In some embodiments, the attachment 113 is configured to remain stationary when the accordion bladder compresses to block the shaft with the stopper 115.

In some embodiments, the accordion bladder 110 includes one or more bellows 117. In some embodiments, an angle X is formed between the bellows 117 when the accordion bladder 110 is not compressed. In some embodiments, angle X is 68°, but in other embodiments, the angle X may be anywhere from 1°-89°. In some embodiments, when the accordion bladder 110 is compressed, the angle X is reduced to 0° so that the bellows 117 touch.

In some embodiments, the accordion bladder 110 includes at least one opening 112. Although two openings 112 are illustrated in FIG. 2B, any number of openings 112 may be on accordion bladder 110. In some embodiments, the number of openings 112 correspond to the viscosity of the formula being dispensed, i.e. more openings are located on the accordion bladder 110 for less viscous formula and less openings are located on the accordion bladder 110 for more viscous formula). In some embodiments, the size of the openings correspond to the viscosity of the formula beings dispensed (i.e. larger openings are used for more viscous formula, and smaller openings are used for less viscous formula). In some embodiments, the at least one opening 112 is located on the base 119 of the accordion stopper 110, at the base of the stopper 115.

In operation, when the bottle 200 is compressed, the stopper 115 lifts to block the shaft 130 so that formula cannot enter the distributor nozzle 140 (as shown in FIG. 4). Instead, the formula accumulates in the cap 150 in a metered dose. When the bottle is no longer being compressed, the stopper 118 drops back down, and the formula flows through the at least one opening 112 in the accordion bladder 110. When the bottle is compressed a second time, in some embodiments, accordion bladder 110 is compressed, like an accordion, and pushes the metered dose out of the membrane 118 into the shaft 180 and to the distributor nozzle 140. In some embodiments, as the metered dose is dispensed, the cap 150 fills with a second metered dose, so that when the bottle 200 is compressed again, a second metered dose is dispensed. In some embodiments, the bottle 200 can be compressed any number of times in this manner to dispense any number of metered doses.

In some embodiments, the metered dose is however much formula can fit inside the cap 150 of the dispensing system. In some embodiments, the metered dose is the amount of formula suggested by a manufacturer.

In some embodiments, if the bottle 200 is lightly compressed, the stopper 115 doesn't fully cover the shaft 130, allowing the formula to be dispensed from the dispensing system 100 in a continuous stream.

Figure 3:
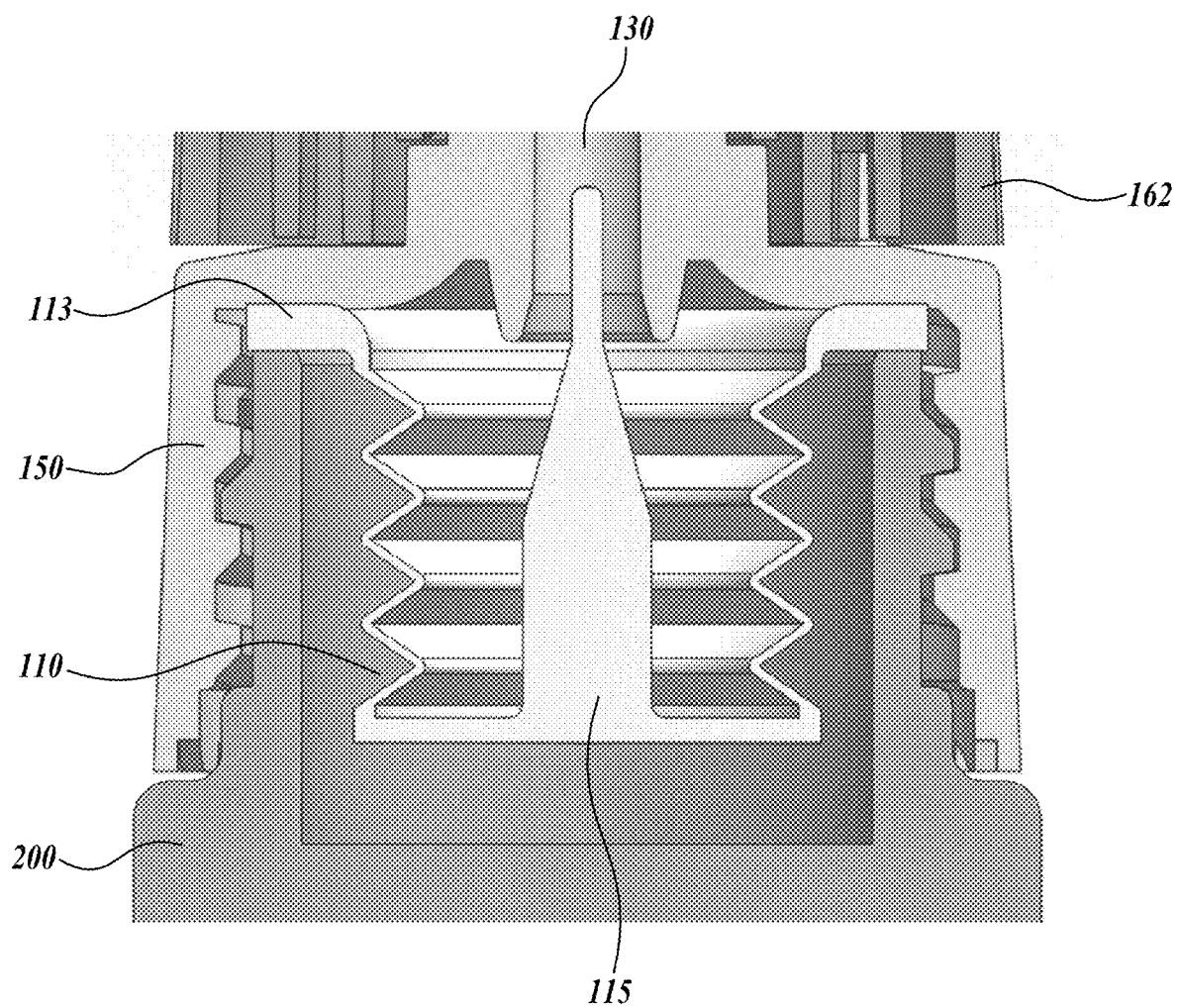
FIG. 3 is cross section of an example dispensing system, in accordance with the present technology.

FIG. 3 is cross section of an example dispensing system, in accordance with the present technology;

In some embodiments, the accordion bladder 110 includes at least one opening 112 located on the base 119 at the base of the stopper 115.

In operation, the accordion bladder 110 compresses, and the stopper 115 lifts into the shaft 130. In some embodiments, the bottle 200 is squeezed. In some embodiments, the cap 120 fills with formula (as described in FIG. 6), the accordion bladder 110 compresses to block the shaft 130 with the stopper 115. When the bottle 200 is no longer compressed, the accordion bladder 110 returns back to its uncompressed state, and the formula flows through the at least one opening 112 located on the base 119 of the accordion bladder 110, at the base of the stopper 115, so that the formula is retained in the accordion bladder 110. When the bottle 200 is compressed again, the accordion bladder 110 compresses again to push the formula into the shaft 130.

FIG. 4 is an internal view of an example dispensing system, in accordance with the present technology. In some embodiments, the dispensing system 100 includes a cap 150, a shaft 130, and a distributor nozzle 140. As illustrated in FIG. 4, in some embodiments, the dispensing system 100 is secured to a bottle 200.

In some embodiments, the shaft 130 is hollow. In some embodiments, the cap 150 is in fluid communication with the shaft 130. In some embodiments, the shaft 130 terminates in the distributor nozzle 140. In some embodiments, the distributor nozzle 140 includes one or more slits 142 to dispense formula. In operation, when the outer nozzle 160 covers the distributor nozzle 140 as shown in FIG. 1, the distributor nozzle 140 distributes the formula inside the outer nozzle 140 and out of the hole at the tip of the outer nozzle 140 when the dispenser is in an active state. In some embodiments, such as the one illustrated in FIG. 3, the distributor nozzle 140 does not include a hole at the tip of the distributor nozzle 140. When the actuator 162 is actuated, the outer nozzle 160 twists and lifts, exposing a hole at the top of the outer nozzle, thereby placing the dispensing system into an active state. In some embodiments, formula flows from the one or more slits 142 on the distributor nozzle 140 out of the hole in the outer nozzle 160, while the distributor nozzle 140 remains stationary. In some embodiments, the dispenser 100 can be placed in an active state by pulling up on the outer nozzle 160 while the distributor nozzle 140 remains stationary. In some embodiments, when the actuator 162 is actuated in a different way, such as twisted in the opposite direction, the dispensing system is placed in an inactive state when the outer nozzle 160 drops and closes the opening with the tip of the distributor nozzle 140.

Figure 5:
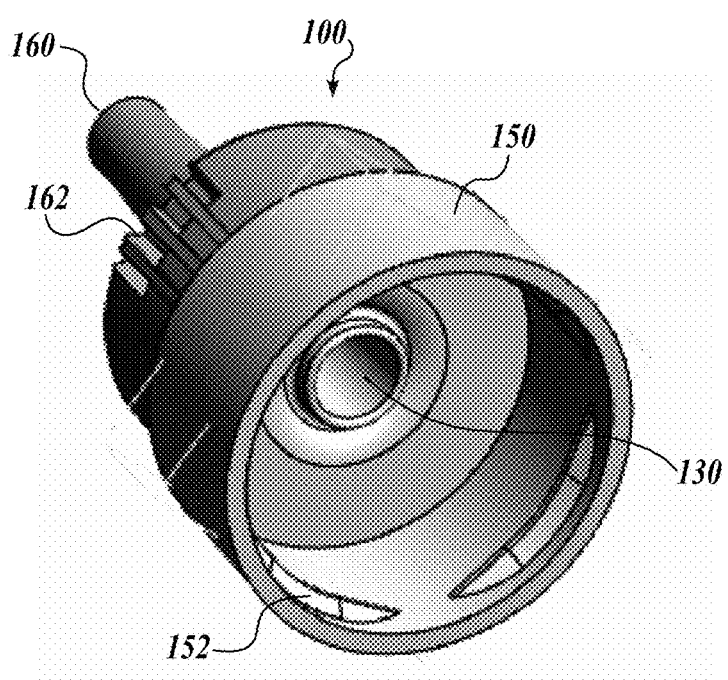
FIG. 5 is an example dispensing system, in accordance with the present technology.

FIG. 5 is an example dispensing system 100, in accordance with the present technology. In some embodiments, the dispensing system 100 includes an outer nozzle 160, an actuator 162, a cap 150, a shaft 130, and at least two tabs 152.

In some embodiments, the dispensing system 100 includes a cap 150. In some embodiments, the cap includes at least two tabs 152 near the base of the cap 150, to secure the dispensing system 100 to a bottle. In some embodiments, the cap 150 is slightly larger than the neck of the bottle, so that the cap 150 can fit over the neck of the bottle. The cap 150 can be modified to fit any size of bottle.

In some embodiments, the dispensing system 100 is secured to a bottle (as shown in FIG. 1) with the at least two tabs 152. In some embodiments, the at least two tabs 152 are shaped like crescents, such as illustrated in FIG. 5. In some embodiments, the one or more tabs are rectangular, organically shaped, or any shape capable of securing the dispensing system 100 to a bottle. In some embodiments, the at least two tabs are 180 degrees from one another. In some embodiments, the at least two tabs 152 are spaced equidistantly from one another, such as four tabs at 0 degrees, 90 degrees, 180 degrees, and 270 degrees. In some embodiments, the at least two tabs are configured to rest inside a groove on the neck of the bottle, so that they are snapped onto the neck of the bottle and prevent the dispensing system 100 from being removed from the bottle.

In operation, the cap is placed onto the neck of the bottle, and pressure is applied until the cap 150 is secure on the bottle. In some embodiments, the at least two tabs 152 rest inside a groove on the neck of the bottle. In some embodiments, the two or more tabs 152 apply pressure to the neck of the bottle so that it is secured to the dispensing system 100.

Figure 6:
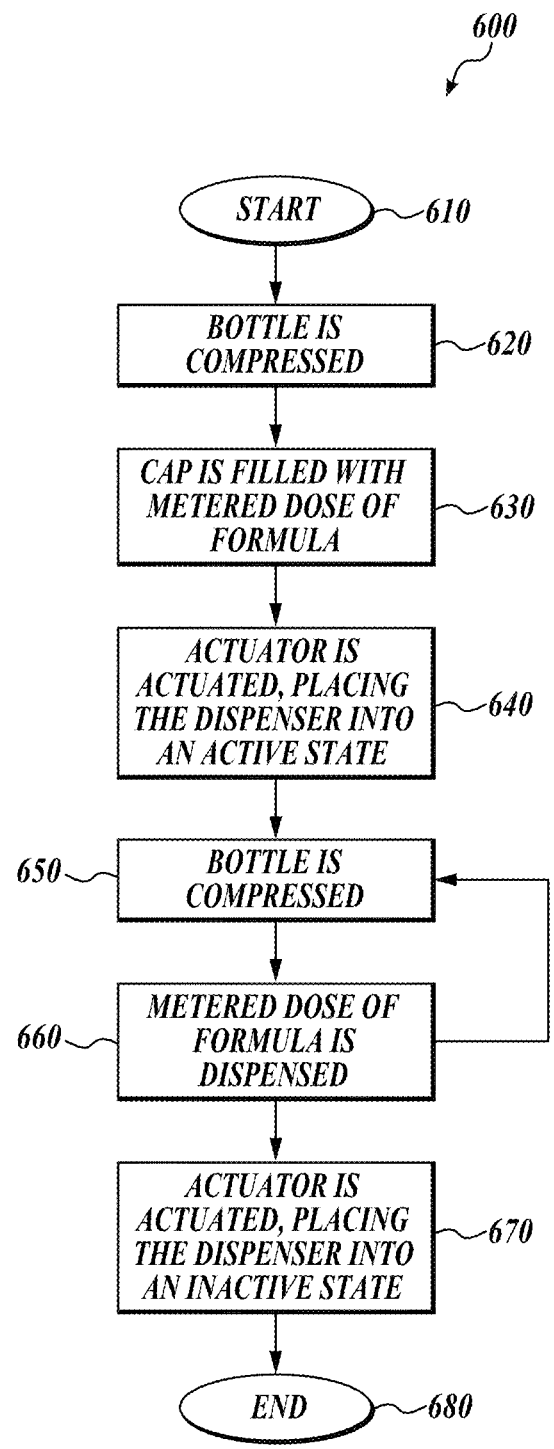
FIG. 6 is an example method of dispensing a formula, in accordance with the present technology.

FIG. 6 is an example method 600 of dispensing a formula, in accordance with the present technology. In block 610, the method begins.

In block 620, the bottle is compressed. In some embodiments, the bottle may be compressed by a user, such as by squeezing the bottle. In some embodiments, the bottle may be compressed by manufacturing equipment. In some embodiments, the bottle is compressed with enough force to lift a stopper of an accordion bladder to block a shaft of the dispensing system. When this occurs, formula is unable to flow into the shaft of the dispensing system. In some embodiments, the bottle is compressed with less force, so that the stopper does not fully lift to block the shaft of the dispensing system. When this occurs, formula can flow continuously into the shaft of the dispensing system.

In block 630, the cap is filled with a metered dose of the formula. In some embodiments, the cap is designed to accommodate the desired dose of formula. In some embodiments, the formula flows from the bottle into the cap of the dispensing system. In some embodiments, when the bottle is no longer being compressed, the metered dose stays retained in the accordion bladder when the accordion bladder drops back down. In some embodiments, the formula flows through a series of openings at the base of the accordion bladder, while the accordion bladder descends so that the metered dose is retained in the accordion bladder. In some embodiments, the openings in the accordion bladder are designed to accommodate a more or less viscous formula. In some embodiments, the openings in the accordion bladder are smaller when the formula is less viscous, such as in the case the formula is a liquid. In some embodiments, the openings in the accordion bladder are larger when the formula is more viscous.

In block 640, the actuator of the dispensing system is actuated, and the dispensing system is placed into an active state. An active state is a state in which the dispenser can dispense the formula. In some embodiments, the actuator is threaded, meaning that when the actuator is twisted in a particular direction, such as clockwise, the outer nozzle of the dispensing system lifts to expose a hole at the tip of the outer nozzle. In some embodiments, once the dispensing system is placed into an active state, the formula can flow from the accordion bladder, into the shaft, through the one or more slits in the distributor nozzle, and out the hole at the tip of the outer nozzle.

In block 650, the bottle is compressed again. In some embodiments, the dispensing system can be turned upside down before being compressed for a second time, but in some embodiments, the dispensing system remains upright when it is compressed again.

In block 660, the metered dose of formula is dispensed. In some embodiments, the metered dose retained in the accordion bladder flows into the shaft of the dispensing system as the accordion bladder is compressed again, through the slits of the distributor nozzle, and out the hole at the tip of the outer nozzle. In some embodiments, as a first metered dose is being dispensed, the accordion bladder is filling with a second metered dose. If a user decides to dispense another metered dose, the user can compress the bottle once again in block 550 and continue dispensing the number of metered doses desired.

Optionally, in block 670, the actuator may be actuated once again, placing the dispenser into an inactive state. An inactive state is a state where the dispensing system cannot dispense formula. In some embodiments, such as when the actuator is threaded, the dispenser can be placed into an inactive statement by twisting the cap in the opposite direction, such as counterclockwise. In some embodiments, when the cap is twisted, the outer nozzle drops back down so that the hole at the tip of the outer nozzle is covered by the tip of the distributor nozzle, so that formula cannot be dispensed.

In block 680, the method ends. The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The invention claimed is:

1. A dispensing system comprising:
   a cap configured to secure the dispensing system to a bottle filled with a formula, wherein the cap is configured to retain a metered dose of the formula;
   a shaft in fluid communication with the cap;
   an accordion bladder inside the cap, wherein the accordion bladder comprises at least one opening, one or more bellows, and a stopper, wherein the stopper is configured to lift when the bottle is compressed, thereby blocking the shaft;
   a distributor nozzle in fluid communication with the shaft; and
   an outer nozzle covering the distributor nozzle and configured to dispense the formula.

2. The dispensing system of claim 1, wherein the cap further comprises at least two tabs to secure the cap to the bottle.

3. The dispensing system of claim 1, wherein the at least one opening is located on a base of the accordion bladder.

4. The dispensing system of claim 1, wherein an angle between 1°-89° is formed between the one or more bellows when the accordion bladder is not compressed.

5. The dispensing system of claim 1, wherein the formula is a hair product.

6. The dispensing system of claim 1, wherein the dispensing system further comprises an actuator configured to put the dispensing system into an active or inactive state.

7. The dispensing system of claim 6, wherein twisting the actuator in one direction puts the dispensing system into an active state.

8. The dispensing system of claim 7, wherein twisting the actuator in a direction opposite to the one direction puts the dispensing system into an inactive state.

9. The dispensing system of claim 1, wherein the accordion bladder further comprises an attachment, wherein the attachment is configured to secure the accordion bladder to the cap.

10. The dispensing system of claim 9, wherein the attachment is configured to remain stationary when the accordion bladder compresses to block the shaft with the stopper.

* * * * *